May 29, 1934.    W. SHURTLEFF    1,960,926
COMFORT TEMPERATURE REGULATOR
Filed Dec. 29, 1930    2 Sheets-Sheet 1
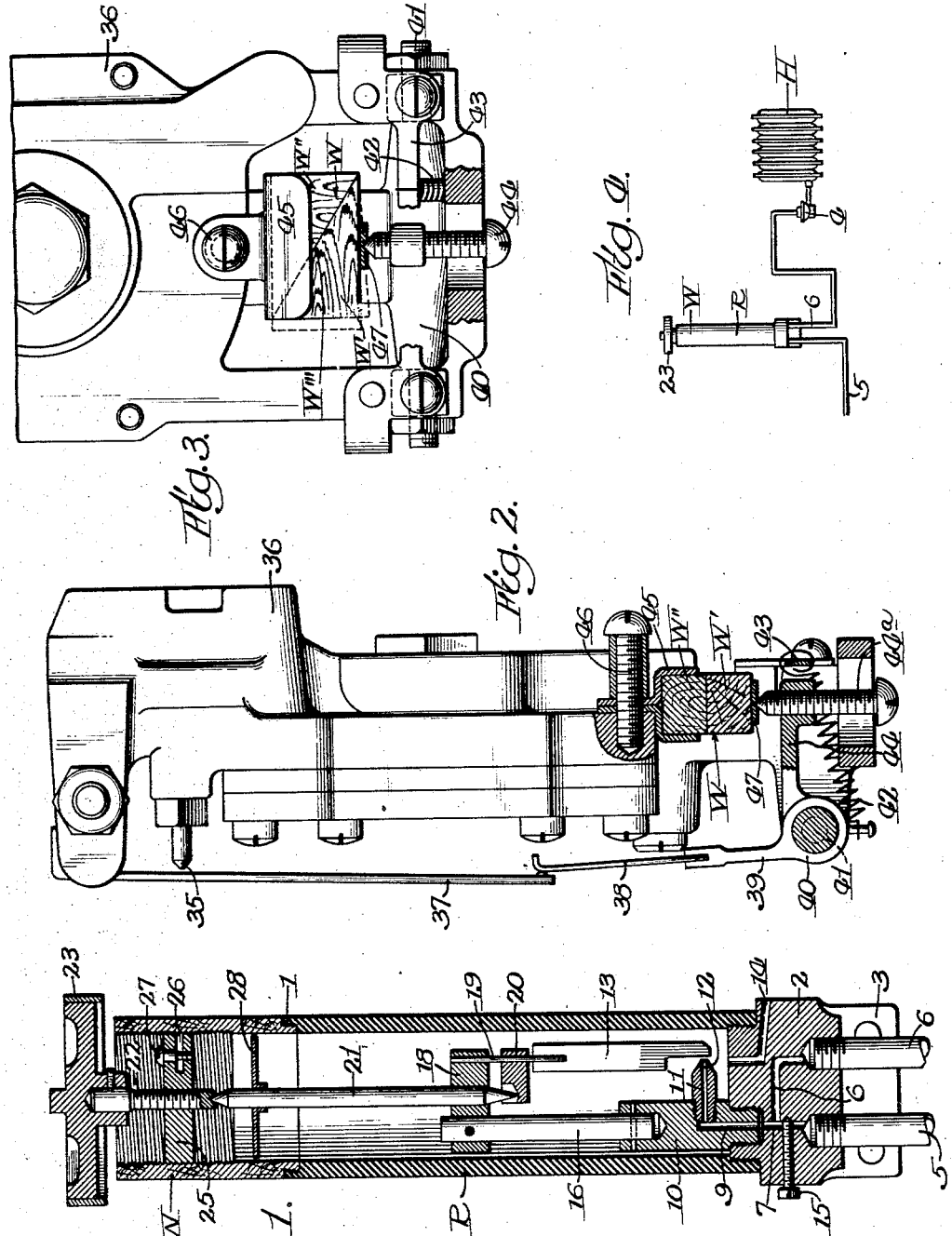

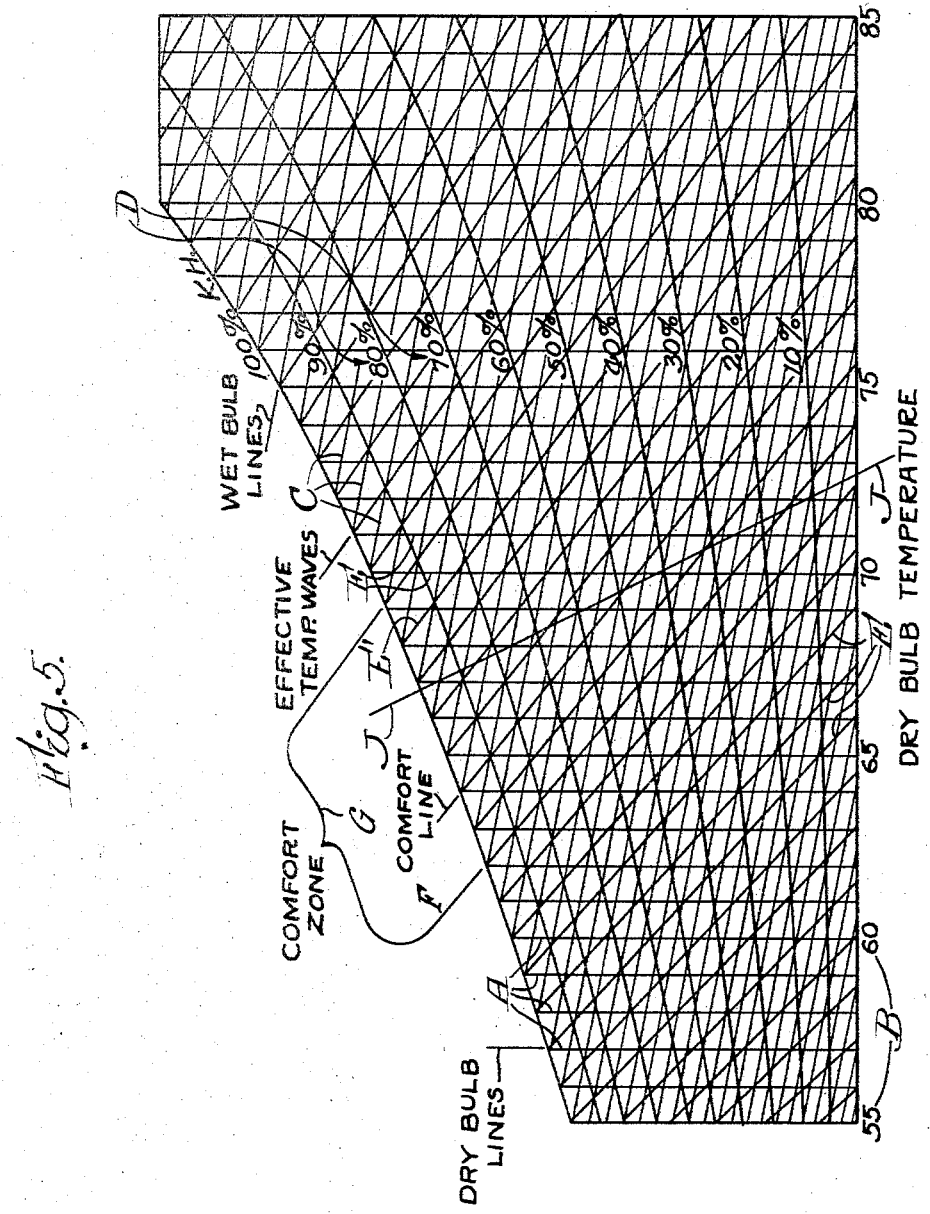

Patented May 29, 1934

1,960,926

UNITED STATES PATENT OFFICE 1,960,926

COMFORT TEMPERATURE REGULATOR

Wilfred Shurtleff, Moline, Ill., assignor to The Herman Nelson Corporation, Moline, Ill., a corporation of Illinois Application December 29, 1930, Serial No. 505,293

2 Claims. (Cl. 236—44)

This invention relates to a control device which will automatically respond to any deviation from a predetermined combination of dry bulb temperature and relative humidity to maintain an effective comfortable temperature represented by that predetermined combination.

One of the objects of the invention is to provide an automatic control device of this character, capable of adjustment to any combination of dry bulb temperature and relative humidity which it is desired to maintain.

A further purpose of the invention is to overcome the tendency of an effective temperature control thermostat to change its setting or adjustment due to so-called "seasoning" of the parts, by the provision of means by which the parts may be adjusted to compensate for this seasoning effect.

A further object is to provide a compensating device which is applicable to any type of control device responsive to both dry bulb temperature and relative humidity, for the purpose of enabling the control device to be adjusted to any desired proportional combination of dry bulb temperature and relative humidity and to permit compensation adjustment for any change in adjustment due to seasoning of the elements thereof.

Other objects of my invention will appear hereinafter.

Referring to the accompanying drawings,

Fig. 1 is a central vertical section of a comfortable temperature control device embodying my invention;

Fig. 2 is a view, partly in vertical section, of another type of thermostat control device showing my invention applied thereto, for the purpose of rendering it responsive to humidity conditions;

Fig. 3 is an enlarged detail section of the adjustable compensating device taken substantially on the line 3—3 of Fig. 2;

Fig. 4 is a diagrammatic view of that much of a heating system as will illustrate the application of my invention for the control of comfortable temperature conditions;

Fig. 5 discloses a chart indicating the relation of the factors which have to do with the production of a comfortable effective temperature.

The terms "comfortable temperature", or "effective sensible temperature", are intended to designate the condition which results from any combination of so-called dry bulb temperature and relative humidity considered as a condition conducive to physical comfort, as distinguished from the term "dry bulb temperature", which is commonly used to refer to temperature without reference to humidity, and as further distinguished from the term "wet bulb temperature", which is commonly used to designate relative humidity.

The chart shown in Fig. 5 is well known to heating and ventilating engineers and is commonly used to indicate the relations between dry bulb temperature and wet bulb temperature or relative humidity. In this chart, the vertical lines A represent the dry bulb temperature at different degrees, the degree of temperature being indicated in an ascending scale from left to right by the letters B, each upright line defining a variation of one degree. The substantially horizontal lines C, marked "wet bulb lines", represent the so-called wet bulb temperature. The curved substantially horizontal lines represent relative humidity, and the percentages of relative humidity are indicated by the letters D in an ascending scale from bottom to top of the chart, each curved line indicating a difference of 10%. The diagonal lines E, marked "effective temperature waves", represent combinations of dry bulb temperature and relative humidity, these combinations being indicated by the intersection of said lines E with the intersection of the vertical dry bulb lines A and the humidity percentage lines D.

There is a certain range ("comfort zone G") of combinations, within which are contained those combinations of dry bulb temperature and relative humidity considered by heating and ventilating engineers as conducive to physical comfort, and within this comfort zone or range there is one group, so to speak, of combinations indicated by the "comfort" line F, in which the comfortable or effective sensible temperature is considered by average healthy people as conducive to physical comfort. For instance, following along this comfort line F, it will be observed that a relative humidity of 90%, with a dry bulb temperature of 65°, would be a combination conducive to average physical comfort. Similarly, along this same line, a relative humidity of 50% with a dry bulb temperature of about 69° would be a comfortable temperature; or, still further down along the line, a relative humidity of 10% and a dry bulb temperature of about 76° would be a comfortable temperature.

However, within a range of the comfort zone G, other proportions of dry bulb temperature and relative humidity constitute combinations which may be considered as conducive to physical comfort; for instance, where the diagonal line E′ intersects the dry bulb temperature line 76, it also intersects the 40% humidity line D. Such a combination of a 76° dry bulb temperature and a 40% relative humidity would be considered as conducive to physical comfort for a different class of people, such as elderly people. Still other combinations may be desirable, such as indicated by the diagonal line J, wherein the rate of compensation of humidity responsiveness differs from that required to follow the combinations indicated by the diagonals E, E' and F.

In accordance with my invention, the control device is made universal in its adjustment in the respect that it can be set to render it responsive to any proportional combination of dry bulb temperature and relative humidity which it is desired to maintain.

In the structure shown in Fig. 1, the dry bulb temperature responsive or thermostatic element is in the form of a tubular member R, preferably made of such material as hard rubber which will elongate upon increase in dry bulb temperature, and shrink or contract upon a decrease in dry bulb temperature. The humidity responsive or wet bulb element is likewise in the form of a tubular member W, preferably of such material as oak wood which will likewise elongate upon an increase of humidity and shorten or contract upon a decrease in humidity. Both of these elements are preferably of the same diameter and are joined together by a threaded joint 1 to form a unit. Wood does not elongate or contract in response to moisture in the direction of its grain, but it will physically change its dimensions in response to moisture in the direction transversely to its grain. For this reason, the tubular element W is arranged with the grain of the wood disposed in a direction transverse to the longitudinal axis of the tube.

The overall length of the unit as a whole varies in response to both dry bulb temperature and relative humidity, and this variation in overall length is utilized to operate a valve for controlling the operation of the heating radiator H (Fig. 4), or other source of heat for the room. The lower end of the tubular unit is threaded for support on a base 2 which has a flange 3 for suitably mounting the structure upon a wall.

The control of the radiator or heating system of the room is affected through the medium of air pressure in a manner well known in the art. The valve 4 for shutting off the radiator and turning it on is connected to a source of air pressure represented by the pipes 5 and 6. The air pressure for operating the valve 4 is controlled by the control device. The pipe 5 connects with a duct 7 in the base 2 of the device. This duct 7 also communicates with the pipe 6 leading to the radiator valve 4, so that when air is admitted through duct 7 to the pipe 6 the valve 4 will be operated to close or shut off the radiator. Another duct 9 leading from the duct 7 up through a post 10 supported in the base, communicates with a nipple 11 having a small orifice 12 at its end, the orifice being adapted to be open and closed by a valve member 13 hereinafter described.

The base has a duct 14 opening to the atmosphere and allows the escape of air from the interior of the tubular responsive unit. A restricter screw 15 for the duct 7 allows air to seep into the ducts 7 and 9, so that when the valve orifice is open the seepage of air escapes through the orifice and vent duct 14 faster than it can flow past the restricter screw 15; consequently, no pressure is developed in the pipe 6 to operate the radiator valve 4. However, when the valve orifice 12 is closed, the seepage of air past the restricter screw causes pressure to build up in the pipe 6 and radiator valve 4 to operate said valve 4 and shut off the radiator.

The post 10 has a rigid upstanding extension or standard 16, upon the upper end of which is a bracket 18. The outer end of this bracket carries a flat spring 19 to which the upper end of the valve member 13 is secured. The spring constantly acts in the direction to urge the valve member against the orifice 12 to close the valve. The spring 19 also carries a small arm 20 which forms a seat for the lower end of an operating rod 21. The upper end of the rod 21 is seated in the end of a screw 22, and the upper end of the screw 22 carries a hand disk member 23 by which the screw 22 may be rotated to adjust the structure for response to the elongation or contraction of the tubular unit. The rod 21 extends through a suitable opening 24 in the bracket 18, but is freely movable in said opening.

The upper end portion of the moisture responsive element W is provided with a head or closure 25 in the form of a disk which is adjustable longitudinally in said element. The interior of the element W and the periphery of the disk 25 are threaded so that by the rotation of the disk it may be accurately shifted axially of the element W. The closure head 25 is split or divided horizontally at one side, as indicated at 26, and a screw 27 provided for drawing the split portions together for the purpose of locking the head in any position to which it is rotarily adjusted.

The adjusting screw 22 is also threaded through the closure head 25 which forms a mounting for said screw. This provides a rigid connection between the screw and the element W through the medium of the closure head 25. The threads for the screw 22 are preferably the same as those on the interior of the element W, that is, the same number of threads per inch, so as not to change the temperature adjustments of the screw 22 by the adjustment of the closure head 25 in the element W.

A guide member 28 is secured to the rod 21, near its upper end, this guide being in the form of a washer which fits within the element tube W, but is freely movable therein. This washer simply serves as a means of centering the rod 21 within the tube.

Since the valve 13 and the rod 21 are yieldingly acted upon by the spring 19, the rod 21 is yieldingly held against the lower end of the adjustment screw 22. It is obvious, therefore, that any lengthening or shortening movement of the tubular unit will be transmitted to the valve member 13 by the rod 21 to close or open the orifice 12, as the case may be.

Assuming now, for instance, that it is desired to maintain a room condition corresponding to a combination of dry bulb temperature of 72° and a relative humidity of 31%. If the dry bulb temperature of the room should for any reason increase above 71°, the temperature responsive element R will elongate, thereby increasing the overall length of the unit, thus allowing the valve 13 to close the orifice 12. This causes the radiator valve 4 to operate and shut off the radiator, thereby allowing the room dry bulb temperature to drop and shortens the unit until the predetermined combination has been restored.

On the other hand, if the humidity in the room increases above 31%, the wood element W responds and elongates the tubular unit, whereupon the valve 13 will close the orifice 12 to shut off the radiator and cause the dry bulb temperature to drop to a point corresponding to the degree necessary to compensate for the increase in the humidity so as to produce the comfortable effective temperature combination of the room.

Now if the relative humidity for any reason is restored to 31%, the reverse action of the unit takes place, that is, the element W will contract and, through the medium of the rod 21, force the valve 12 away from the orifice and cause the radiator valve 4 to open the radiator and raise the dry bulb temperature the corresponding amount.

If it is desired to set the device to maintain a different relation between dry bulb temperature and relative humidity, the necessary compensation to effect this relation is accomplished by the longitudinal adjustment of the disk 25 in the element W to a point corresponding to a desired percentage of relative humidity for a given dry bulb temperature. For instance, if it is desired that the comfortable temperature of the room should consist of a relative humidity of 65%, with a dry bulb temperature of 72°, the disk 25 can be adjusted in the element W so as to render the device responsive to deviations from this combination. The device will thereupon operate to lower the dry bulb temperature when the relative humidity increases and vice versa in the predetermined relation determined by the adjustment.

Thus, the device will always maintain the combination for which it is set and will always maintain the ratio between dry bulb temperature and relative humidity corresponding to that combination. The device is capable of adjustment to any ratio of compensation between dry bulb temperature and relative humidity, and because of this fact it can always be adjusted to compensate for any change in the characteristics of the elements R and W due to the seasoning of the materials which make up these elements; hence, the accuracy of the control device may be permanently maintained absolute at all times throughout a long period of years of service.

In Fig. 2 a type of thermostatic control device is shown which is commonly in use and needs only to be generally described. In this structure, the valve orifice 35 is positioned near the upper end of the base 36 and is controlled by the arm 37 pivoted at its upper end in the base. This arm is actuated by the thermostatic element and its lower end bears against a bi-metallic strip 38 which constitutes the dry bulb temperature responsive element for this purpose. The bi-metallic strip is mounted on the arm 39 of an L-shaped lever 40 which is pivoted at 41 in the lower end of the base. The element 38 is yieldingly urged outwardly away from the base by the spring 42 which is anchored between the lever and a bar 43 at the rear of the base. The other arm 44 of the lever carries an adjusting screw 44ª which bears against the compensating element W. The compensating element W is made responsive to relative humidity, and in order to adapt it to this structure, is made in the form of a rectangular block, as shown clearly in Figs. 2 and 3. This block is interposed between the base and the screw 44ª and any movement thereof, due to expansion or contraction, is transmitted to the lever 40. The block is held in position by a channel-shaped seat 45 fastened to the base by the bolt 46. The adjusting screw 44ª is pointed at its end and bears against a suitable metal bearing plate 47.

The expansion or contraction of the element W in response to humidity thus acts through the screw 44ª, lever 40 and thermostatic element 38 to control the air valve orifice 35. Furthermore, by adjusting the screw toward or from the compensating block the bi-metallic element may be adjusted relatively to the valve-operating arm 37, for the purpose of adjusting the instrument with respect to dry bulb temperature.

As shown more in detail in Fig. 3, the block W is composed of oak or other suitable material for the purpose. It is made up of two parts—W' and W'', having abutting diagonal faces W'' fastened together by glue or otherwise, to hold them together as a unit. The part W' is arranged with its grain extending in a horizontal direction, so that it will vary in thickness in a vertical direction in response to changes in relative humidity. The part W'' is arranged with its grain vertically disposed so that it will not affect the thickness of the block with a change in moisture, and is used simply to make a parallel-faced block which can be bodily shifted laterally in its channel seat without the adjustment of the screw 44ª.

The adjustment of the wood block element W to compensate for different relative humidity conditions is attained by shifting the block horizontally or crosswise, so as to bring a different thickness of the part W' between the end of the adjusting screw and the seat. On account of the varying thickness of the part W', it is obvious that the extent of expansion and contraction correspondingly varies, hence by this variation makes adjustment possible for response to any desired degree of relative humidity and for any change in the characteristics of the elements due to seasoning over a period of years of service.

While I have illustrated my invention in two types of instruments, it is to be understood that the principles of adjustable compensation may be applied to other forms of control devices without departing from the spirit of the invention, and I contemplate any of these applications which come within the scope of the appended claims.

I claim:

1. In a comfort temperature regulator, temperature responsive means, humidity responsive means operably connected thereto, a member operable by the combined movements of the two means, a valve operable by said member to control the flow of a fluid therethrough, said humidity responsive means including a V-shaped wood block cut with the grain on one side and diagonally on the other and having its grain lying transversely to said member, and means for holding said block in various adjusted positions to vary the responsiveness of the wood block to humidity variations.

2. In a comfort temperature regulator, temperature responsive means, humidity responsive means operably connected thereto, a member operable by the combined movements of the two means, a valve operable by said member to control the flow of a fluid therethrough, said humidity responsive means including a V-shaped wood block cut with the grain on one side and diagonally on the other and having its grain lying transversely to said member, a corresponding V-shaped block secured to the first mentioned V-shaped block to form a rectangular block, and means for holding said rectangular block in various adjusted positions to vary the effective length of the wood block.

WILFRED SHURTLEFF.